United States Patent
Eguchi

(10) Patent No.: US 9,554,014 B2
(45) Date of Patent: Jan. 24, 2017

(54) IMAGE PROCESSING APPARATUS FOR DETECTING AND REMOVING A DOCUMENT WRINKLE AREA IN A SCANNED IMAGE

(71) Applicant: KYOCERA Document Solutions Inc., Osaka (JP)

(72) Inventor: Takeshi Eguchi, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/133,965

(22) Filed: Apr. 20, 2016

(65) Prior Publication Data

US 2016/0344897 A1 Nov. 24, 2016

(30) Foreign Application Priority Data

May 22, 2015 (JP) ................. 2015-104897

(51) Int. Cl.
*H04N 1/00* (2006.01)
*H04N 1/409* (2006.01)
*H04N 1/04* (2006.01)

(52) U.S. Cl.
CPC ........ *H04N 1/4097* (2013.01); *H04N 1/00477* (2013.01); *H04N 1/00737* (2013.01); *H04N 1/00769* (2013.01); *H04N 1/00785* (2013.01); *H04N 1/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,833,763 | B2* | 9/2014 | Morikawa | B65H 5/00 271/258.01 |
| 9,444,951 | B2* | 9/2016 | Ichikawa | H04N 1/00323 |
| 2012/0287482 | A1* | 11/2012 | Sakai | H04N 1/00718 358/474 |
| 2014/0236790 | A1* | 8/2014 | Smith | G06Q 40/02 705/35 |
| 2016/0037002 | A1* | 2/2016 | Ichikawa | H04N 1/00323 358/1.15 |

FOREIGN PATENT DOCUMENTS

JP 2011-135320 7/2011

* cited by examiner

*Primary Examiner* — Barbara Reinier

(57) ABSTRACT

A first document image is scanned from a document in a first orientation, and a second document image is scanned from the document in a second orientation different from the first orientation. A wrinkle area candidate detecting unit rotates the first document image by a rotation angle between the first and second orientations, and detects as a wrinkle area candidate an object in a predetermined density range in the rotated first document image and the second document image. A similarity degree determining unit determines a similarity degree between the wrinkle area candidate of the rotated first document image and the corresponding wrinkle area candidate of the second document image. A wrinkle area removing unit removes the wrinkle area candidate as a wrinkle area if the similarity degree falls into a predetermined range.

6 Claims, 3 Drawing Sheets

IMAGE PROCESSING APPARATUS FOR DETECTING AND REMOVING A DOCUMENT WRINKLE AREA IN A SCANNED IMAGE

CROSS-REFERENCE TO RELATED APPLICATIONS

This application relates to and claims priority rights from Japanese Patent Application No. 2015-104897, filed on May 22, 2015, the entire disclosures of which are hereby incorporated by reference herein.

BACKGROUND

1. Field of the Present Disclosure

The present disclosure relates to an image processing apparatus.

2. Description of the Related Art

In order to remove an irregular crease in a document image of a document, an image processing apparatus (a) generates a luminance histogram of the document image, (b) detects the luminance value at the mode in the luminance histogram as a luminance value of a background pixel, (c) detects a predetermined range of the luminance values including the luminance value of a background pixel as a luminance distribution range of a shadow, and (d) replaces luminance values in the luminance distribution range of a shadow to the luminance value of a background pixel.

However, in the aforementioned technique, when a difference between a luminance value of a background and a luminance value of a crease (wrinkle) in a document image is large, the crease is not removed, and among objects other than the crease, an object having a luminance near the luminance value of a background is improperly removed.

SUMMARY

An image processing apparatus according to an aspect of the present disclosure includes an image scanning unit, a wrinkle area candidate detecting unit, a similarity degree determining unit, and a wrinkle area removing unit. The image scanning unit is configured to optically scan a first document image from a document in a first orientation, and optically scan a second document image from the document in a second orientation different from the first orientation. The wrinkle area candidate detecting unit is configured to rotate the first document image by a rotation angle between the first orientation and the second orientation, and detect as a wrinkle area candidate an object in a predetermined density range in the rotated first document image and the second document image. The similarity degree determining unit is configured to determine a similarity degree between the wrinkle area candidate of the rotated first document image and the corresponding wrinkle area candidate of the second document image. The wrinkle area removing unit is configured (a) not to remove the wrinkle area candidate if on the basis of the similarity degree the wrinkle area candidate of the rotated first document image agrees with the wrinkle area candidate of the second document image, and (b) to remove the wrinkle area candidate as a wrinkle area in the first document image or the second document image and generate the document image in which the wrinkle area was removed if the similarity degree falls into a predetermined range.

These and other objects, features and advantages of the present disclosure will become more apparent upon reading of the following detailed description along with the accompanied drawings.

DETAILED DESCRIPTION

Hereinafter, an embodiment according to an aspect of the present disclose will be explained with reference to drawings.

Figure 1:
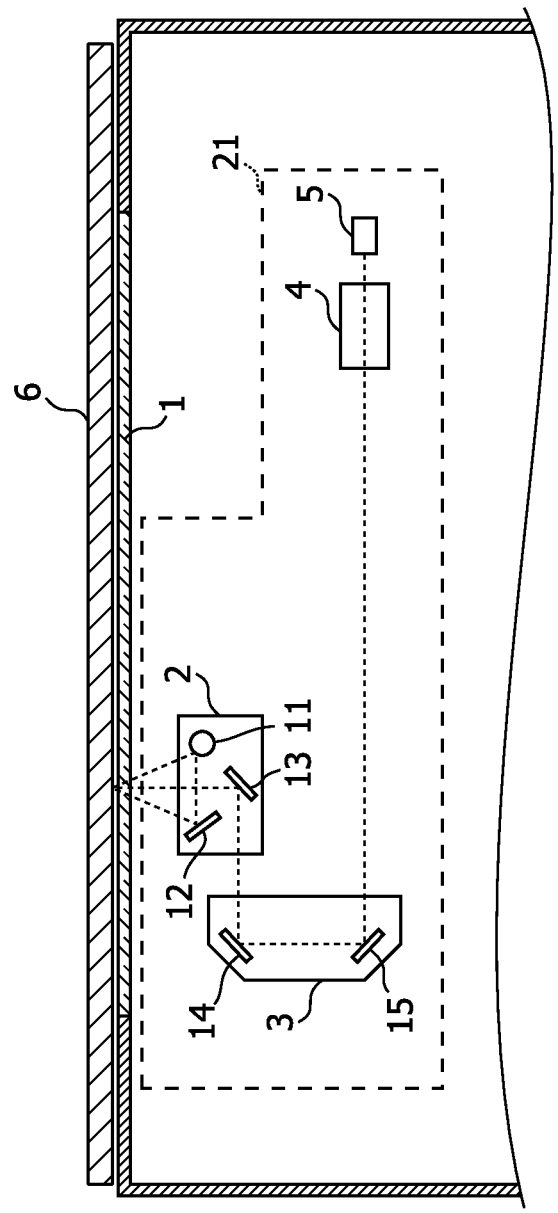
FIG. 1 shows a side view an internal configuration of an image scanning apparatus in this disclosure.

FIG. 1 shows a side view an internal configuration of an image scanning apparatus in this disclosure. The image scanning apparatus shown in FIG. 1 is an apparatus such as scanner, copier, or digital multi-function peripheral. In FIG. 1, a contact glass 1 is disposed on a top surface of a body of the image scanning apparatus, and is a transparent document table on which a document is put when a document image is scanned from the document.

A carriage 2 is capable of moving in the secondary scanning direction with an unshown driving source. The carriage 2 includes a light source 11 and mirrors 12 and 13. The light source 11 is arranged along the primary scanning direction, and emits light, for example, with pluralities of aligned light emitting diodes. The light emitted from the light source 11 falls on a document put on the contact grass 1, corresponding to a position of the carriage 2, directly or after reflecting at the mirror 12. The light falling on the document reflects at a surface of the document. The mirror 13 reflects the reflection light from the document toward the carriage 3.

Further, the carriage 3 is capable of moving together with the carriage 2 in the secondary scanning direction with an unshown driving source. The carriage 3 includes mirrors 14 and 15. The mirrors 14 and 15 reflect light from the mirror 13 of the carriage 2 twice, and outputs the light in the secondary scanning direction.

An imaging lens 4 focuses the light from the mirror 15 of the carriage 3 onto an image sensor 5. The image sensor 5 is a one-dimensional image sensor which includes light sensing elements corresponding to the predetermined number of pixels aligned in the primary scanning direction, and outputs electronic signals which indicate respective amounts sensed on the pixels line by line. For example, the image sensor 5 may be a CCD (Charge Coupled Device).

The carriages 2 and 3, the imaging lens 4, the image sensor 5, the light source 11, the mirrors 12 and 13, and the mirrors 14 and 15 compose an image scanning unit 21 that scans an image of a document put on the contact glass 1 and pressed down by a document cover 6.

Figure 2:
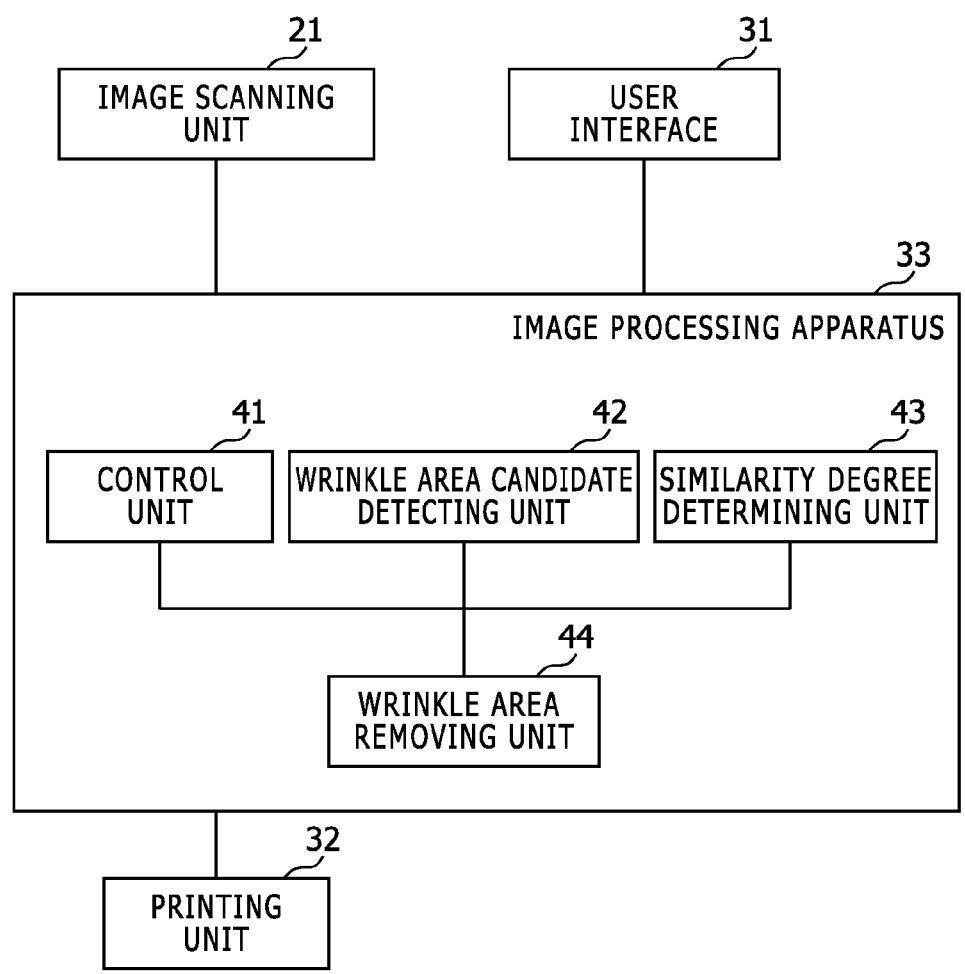
FIG. 2 shows a block diagram that indicates an electronic configuration of the image scanning apparatus shown in FIG. 1.

FIG. 2 shows a block diagram that indicates an electronic configuration of the image scanning apparatus shown in FIG. 1.

In FIG. 2, a user interface 31 includes an input device such as a hard key or a touch panel that detects a user operation and a display device such as a liquid crystal display that displays sorts of information to a user.

A printing device 32 is an internal device that performs printing an image based on image data on a printing paper sheet or the like in an electrographic manner or the like.

The image processing apparatus 33 is a device that performs image processing for an image scanned by the image scanning unit 21. The image processing apparatus 33 is embodied with, for example, an ASIC (Application Specific Integrated Circuit), a computer which acts in accordance with a control program, and the like.

The image processing apparatus 33 includes a control unit 41, a wrinkle area candidate detecting unit 42, a similarity degree determining unit 43, and a wrinkle area removing unit 44.

The control unit 41 controls the image scanning unit 21, the printing unit 32 and the like and thereby obtains a document image from the image scanning unit 21 and using the printing unit 32, performs printing the image for which the image processing has been performed.

The control unit 41 causes the image scanning unit 21 to perform image scanning twice for one document. In the first image scanning, the document is put on the image scanning unit 21 in a first orientation; and in the second image scanning, the document is put on the image scanning unit 21 in a second orientation. This second orientation is different from the first orientation.

For example, a rotation angle between the first orientation and the second orientation is 90 degrees or 270 degrees.

The wrinkle area candidate detecting unit 42 rotates the first document image by a rotation angle between the first orientation and the second orientation; and as a wrinkle area candidate, detects an object in a predetermined density range in the aforementioned second document image and the rotated first document image.

For example, this predetermined density range is a predetermined low density range higher than a background density and sufficiently lower than a density of a character object (i.e. a black character). The character object is detected in the document image using a character recognition technique, an area separation technique or the like. As the background density, a density of a position with no objects is used.

In this embodiment, the wrinkle area candidate detecting unit 42 searches an edge (i.e. a boundary as a contour) in the predetermined density range in the first document image and the second document image; and as the wrinkle area candidate, detects an area closed by the edge.

The similarity degree determining unit 43 determines a similarity degree between the wrinkle area candidate of the rotated first document image and the corresponding wrinkle area candidate of the second document image.

In this process, a wrinkle area candidate in the second document image is identified at a position same as a position of a wrinkle area candidate in the rotated first document image, and a similarity degree is determined between the wrinkle area candidate of the rotated first document image and the identified wrinkle area candidate of the second document image.

In this embodiment, the similarity degree determining unit 43 determines a ratio of N1 to N2 as the similarity degree. The N2 is the number of all pixels with the edge on one of (a) the wrinkle area candidate in the rotated first document image and (b) the wrinkle area candidate in the second document image, and the N1 is the number of pixels in a same shape in both the edge on the wrinkle area candidate in the first document image and the edge on the wrinkle area candidate in the second document image. It should be noted that the similarity degree determining unit 43 may determine a ratio of N3 to N2 as the similarity degree. The N3 is the number of pixels included in an overlapping part with each other between a wrinkle area candidate in the second document image and a wrinkle area candidate in the rotated first document image.

For example, the similarity degree determining unit 43 extracts one or more pixel patterns that indicates an edge shape of a wrinkle area candidate in the rotated first document image, performs pattern matching using the extracted one or more pixel patterns for an edge of a corresponding wrinkle area candidate in the second document image, and determines the number of pixels having the same edge shape.

The wrinkle area removing unit 44 (a) does not to remove the wrinkle area candidate if on the basis of the aforementioned similarity degree the wrinkle area candidate of the rotated first document image agrees with the wrinkle area candidate of the second document image, and (b) removes the wrinkle area candidate as a wrinkle area in the first document image or the second document image and generates the document image in which the wrinkle area was removed if the aforementioned similarity degree falls into a predetermined range. In this process, the wrinkle area removing unit 44 replaces a pixel value of the wrinkle area candidate to be removed with a peripheral pixel value (i.e. a background pixel value) of the wrinkle area candidate to be removed, and thereby removes this wrinkle area candidate.

It should be noted that the wrinkle area removing unit 44 may remove the wrinkle area candidate as a wrinkle area in one of the first document image and the second document image that includes a larger number of the wrinkle area candidates than the other and thereby generate the document image in which the wrinkle area was removed.

Further, the wrinkle area removing unit 44 may remove the wrinkle area candidate as a wrinkle area in one of the first document image and the second document image that has a lower average density of the wrinkle area candidates than the other and thereby generate the document image in which the wrinkle area was removed.

Figure 3:
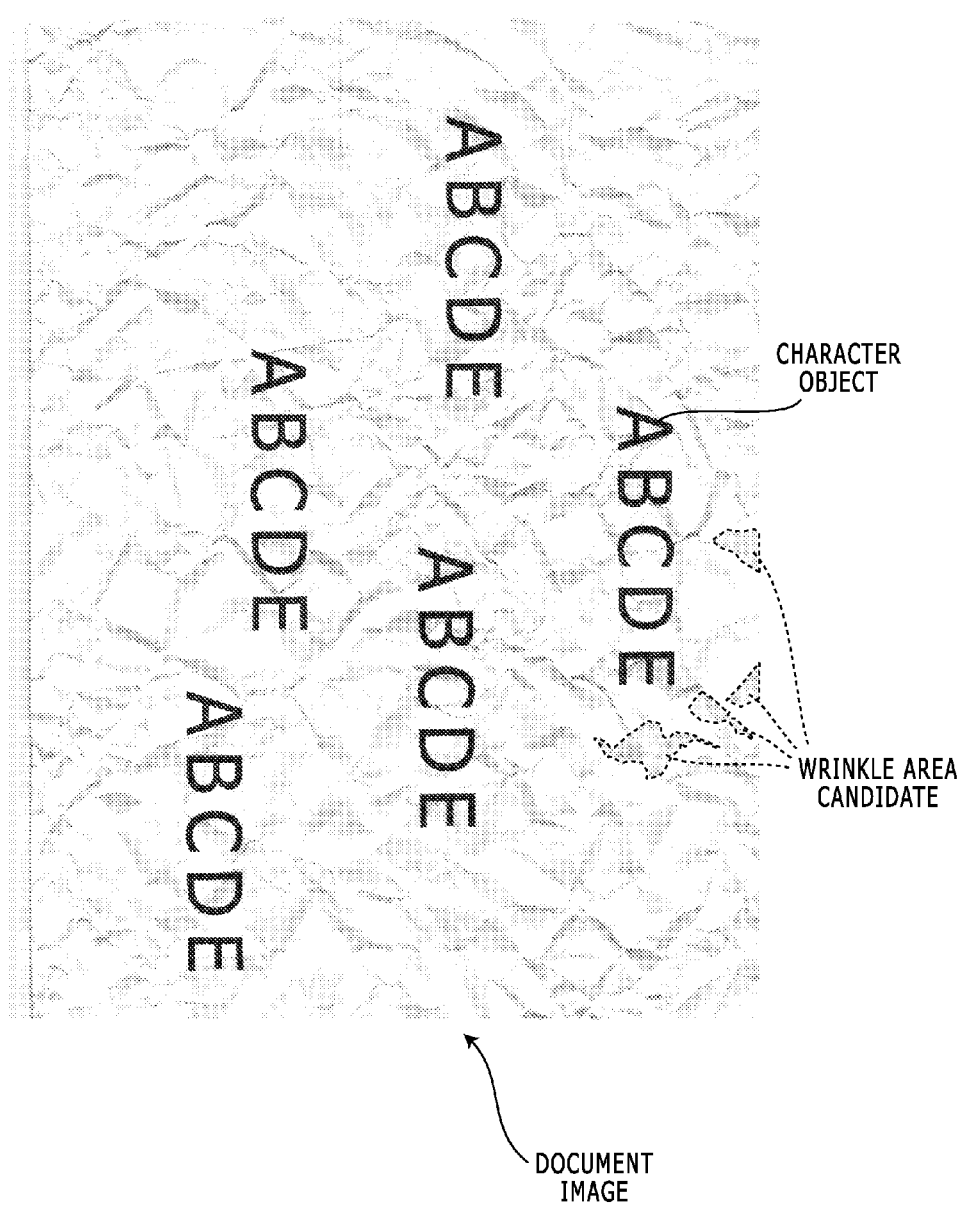
FIG. 3 shows a diagram that indicates an example of a document image of a document that includes irregular wrinkles.

FIG. 3 shows a diagram that indicates an example of a document image of a document that includes irregular wrinkles. As shown in FIG. 3, the document image includes a shadow due to a wrinkle. This shadow is detected as a wrinkle area candidate. In addition, if the document image includes an object (i.e. a character, a figure or the like) that has a density similar to this shadow, then this object also is detected as a wrinkle area candidate.

A shape of the shadow due to a wrinkle changes in accordance with an oncoming direction of the light from the aforementioned light source 11 and the aforementioned mirror 12. Therefore, when changing an orientation of a document put for image scanning, a shape of a shadow due to a wrinkle changes in the document image. Contrarily, regarding an object (i.e. a character or the like) printed on the document, even when changing an orientation of a document put for image scanning, a shape of the object does not change in the document image.

Therefore, among wrinkle area candidates, the similarity degree of such an object in the document image is high and almost 100 percent, and it is determined that the wrinkle area candidate in the rotated first document and the wrinkle area candidate in the second document are the same as each other corresponding to such an object, and consequently the wrinkle area candidate of such an object is excluded from a target to be removed.

Contrarily, among wrinkle area candidates, the similarity degree of a shadow of a wrinkle is moderate, and it is not determined that the wrinkle area candidate of a shadow in the rotated first document and the wrinkle area candidate of a shadow in the second document are the same as each other, and consequently the wrinkle area candidate of a shadow of a wrinkle is included in a target to be removed. In the second document image and the rotated first document image, a shape of a ridgeline of a wrinkle appears to be same as each other, but a shape of a shadow spreads from the ridgeline appears to be different from each other. Thus, a shape of a shadow of a wrinkle in the second document image and a shape of a shadow of the wrinkle in the rotated first document image are same as each other in a part, but are different from each other in the other part (i.e. a part corresponding to the spreading shadow). Therefore, for the similarity degree, a first threshold value and a second threshold value higher than the first threshold value are set, and if the similarity degree of a wrinkle area candidate is higher than the first threshold value and lower than the second threshold value, then the wrinkle area candidate gets included in a target to be removed.

The following part explains a behavior of the aforementioned image scanning apparatus.

Firstly, a user puts a document in a certain orientation on the contact glass 1, and operates the user interface 31 and thereby causes the apparatus to perform the first image scanning.

Subsequently, the user puts the document on the contact glass 1 in an orientation different from the orientation at the first image scanning, and operates the user interface 31 and thereby causes the apparatus to perform the second image scanning.

In accordance with the aforementioned user operations, the control unit 41 controls the image scanning unit 21 and thereby obtains a first document image at the first image scanning and obtains a second document image at the second image scanning.

The wrinkle area candidate detecting unit 42 identifies a rotation angle between the document orientation at the first image scanning (i.e. a first orientation) and the document orientation at the second image scanning (i.e. a second orientation).

For example, the wrinkle area candidate detecting unit 42 compares a (rectangular) contour shape of the document image, a shape of an object (i.e. a character or the like) in the document image or the like in the first document image and the second document image with each other, and automatically identifies the aforementioned rotation angle on the basis of the comparing result. Alternatively, the rotation angle may be fixed in advance, and at the second image scanning, the user may be forced to put the document in an orientation so as to get this fixed rotation angle.

Subsequently, the wrinkle area candidate detecting unit 42 rotates the first document image by this rotation angle; and as a wrinkle area candidate, detects an object in a predetermined density range in the second document image and the rotated first document image.

Subsequently, for each one of wrinkle area candidates in the rotated first document image, the similarity degree determining unit 43 determines the similarity degree between the wrinkle area candidate in the rotated first document image and the corresponding wrinkle area candidate in the second document image.

Subsequently, the wrinkle area removing unit 44 firstly selects one of the second document image and the rotated first document image; and as a wrinkle area, removes each wrinkle area candidate having a similarity degree higher than the first threshold value and lower than the second threshold value in the selected document image. Contrarily, if the similarity degree is equal to or higher than the second threshold value, the wrinkle area removing unit 44 determines that the shapes of the corresponding wrinkle area candidates in the second document image and the rotated first document image is the same as each other, and consequently does not remove the wrinkle area candidate.

In the aforementioned manner, a wrinkle area is removed in the document image.

If wrinkle area candidates having a similarity degree equal to or lower than the first threshold value is more than a predetermined ratio to all wrinkle area candidates, it may be determined that the first document image and the second document image are document images of respective different documents, and thus an error message may be displayed on the user interface 31 and this process may be terminated.

In the aforementioned embodiment, the image scanning unit 21 optically scans a first document image from a document in a first orientation, and optically scans a second document image from the document in a second orientation different from the first orientation. The wrinkle area candidate detecting unit 42 rotates the first document image by a rotation angle between the first orientation and the second orientation, and detects as a wrinkle area candidate an object in a predetermined density range in the second document image and the rotated first document image. The similarity degree determining unit 43 determines a similarity degree between a wrinkle area candidate of the rotated first document image and a corresponding wrinkle area candidate of the second document image. The wrinkle area removing unit 44 (*a*) does not to remove the wrinkle area candidate if on the basis of the similarity degree the wrinkle area candidate of the rotated first document image agrees with the wrinkle area candidate of the second document image, and (b) removes the wrinkle area candidate as a wrinkle area in the first document image or the second document image and thereby generates the document image in which the wrinkle area was removed if the similarity degree falls into a predetermined range.

Consequently, without improperly removing an object in a document image, an irregular wrinkle in the document image is properly removed.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, if a positional difference between a position of an object (a character or the like) in the second document image and a position of a corresponding object in the rotated first document image is detected, all objects may be shifted (i.e. moved in parallel) in the rotated first document image or the second document image so as to remove the positional difference.

What is claimed is:
1. An image processing apparatus, comprising:
    an image scanning unit configured to optically scan a first document image from a document in a first orientation, and optically scan a second document image from the document in a second orientation different from the first orientation;

a wrinkle area candidate detecting unit configured to rotate the first document image by a rotation angle between the first orientation and the second orientation, and detect as a wrinkle area candidate an object in a predetermined density range in the rotated first document image and the second document image;

a similarity degree determining unit configured to determine a similarity degree between the wrinkle area candidate of the rotated first document image and the corresponding wrinkle area candidate of the second document image; and a wrinkle area removing unit configured (a) not to remove the wrinkle area candidate if on the basis of the similarity degree the wrinkle area candidate of the rotated first document image agrees with the wrinkle area candidate of the second document image, and (b) to remove the wrinkle area candidate as a wrinkle area in the first document image or the second document image and generate the document image in which the wrinkle area was removed if the similarity degree falls into a predetermined range.

2. The image processing apparatus according to claim 1, wherein the predetermined density range is a predetermined range (a) lower than a density of a character object and (b) higher than a background density.

3. The image processing apparatus according to claim 1, wherein the wrinkle area removing unit removes the wrinkle area candidate as a wrinkle area in one of the first document image and the second document image that includes a larger number of the wrinkle area candidates than the other and thereby generates the document image in which the wrinkle area was removed.

4. The image processing apparatus according to claim 1, wherein the wrinkle area removing unit removes the wrinkle area candidate as a wrinkle area in one of the first document image and the second document image that has a lower average density of the wrinkle area candidates than the other and thereby generates the document image in which the wrinkle area was removed.

5. The image processing apparatus according to claim 1, wherein the wrinkle area candidate detecting unit searches an edge in the predetermined density range in the first document image and the second document image, and detects as the wrinkle area candidate an area closed by the edge.

6. The image processing apparatus according to claim 5, wherein the similarity degree determining unit determines a ratio of N1 to N2 as the similarity degree;
   where the N2 is the number of all pixels with the edge on one of (a) the wrinkle area candidate in the rotated first document image and (b) the wrinkle area candidate in the second document image, and
   the N1 is the number of pixels in a same shape in both the edge on the wrinkle area candidate in the first document image and the edge on the wrinkle area candidate in the second document image.

* * * * *